(12) United States Patent
Torch

(10) Patent No.: US 7,468,563 B2
(45) Date of Patent: Dec. 23, 2008

(54) OCEAN WAVE AIR PISTON

(76) Inventor: Joseph J Torch, 34 Abbott Rd., Towaco, NJ (US) 07082

(*) Notice: Subject to any disclaimer, the term of this patent is extended or adjusted under 35 U.S.C. 154(b) by 0 days.

(21) Appl. No.: 11/677,563

(22) Filed: Feb. 21, 2007

(65) Prior Publication Data

US 2008/0197635 A1    Aug. 21, 2008

(51) Int. Cl.
F03B 13/10    (2006.01)
F03B 13/12    (2006.01)
F03B 13/00    (2006.01)
H02P 9/04    (2006.01)

(52) U.S. Cl. ............... 290/42; 290/43; 290/53; 290/54

(58) Field of Classification Search .......... 290/42, 290/43, 53, 54; 60/498, 501, 398, 497; 415/7; 416/7, 85
See application file for complete search history.

(56) References Cited

U.S. PATENT DOCUMENTS

| | | | | |
|---|---|---|---|---|
| 3,970,415 A | * | 7/1976 | Widecrantz et al. | 417/332 |
| 4,281,257 A | * | 7/1981 | Testa et al. | 290/42 |
| 4,560,884 A | * | 12/1985 | Whittecar | 290/42 |
| 4,742,241 A | * | 5/1988 | Melvin | 290/53 |
| 4,931,662 A | * | 6/1990 | Burton | 290/42 |
| 5,854,516 A | * | 12/1998 | Shim | 290/53 |
| 5,921,082 A | * | 7/1999 | Berling | 60/325 |
| 6,291,904 B1 | * | 9/2001 | Carroll | 290/53 |
| 6,717,284 B2 | * | 4/2004 | Lin | 290/53 |

FOREIGN PATENT DOCUMENTS

JP    56113059 A    * 9/1981

* cited by examiner

*Primary Examiner*—Julio Gonzalez R.

(57) ABSTRACT

An ocean wave driven energy device that uses the power of ocean waves to continually lift and lower a float which in turn lifts or lowers one side of a lever arm about a stationary pivot point thereby driving down or raising a piston, which is attached to the opposite side of the lever arm, thru a cylinder which in turn causes large volumes of air to move. That air is funneled to drive turbines which produce electric power.

9 Claims, 8 Drawing Sheets

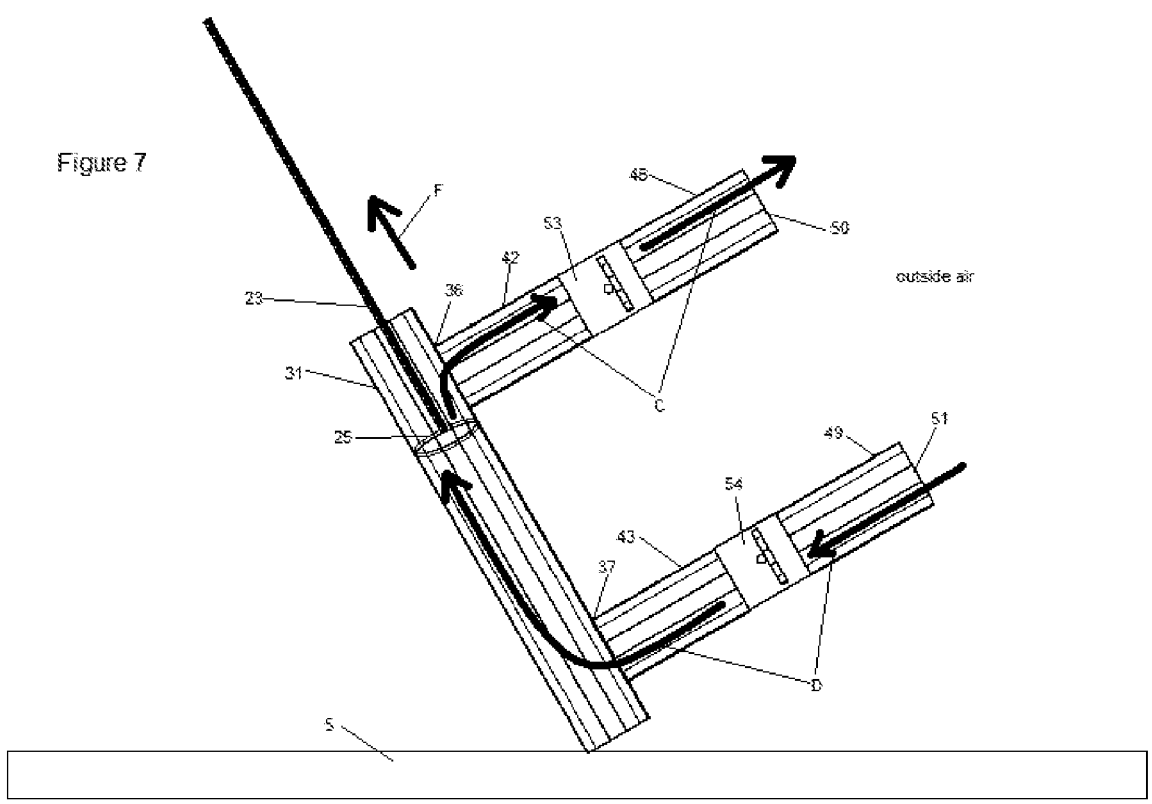

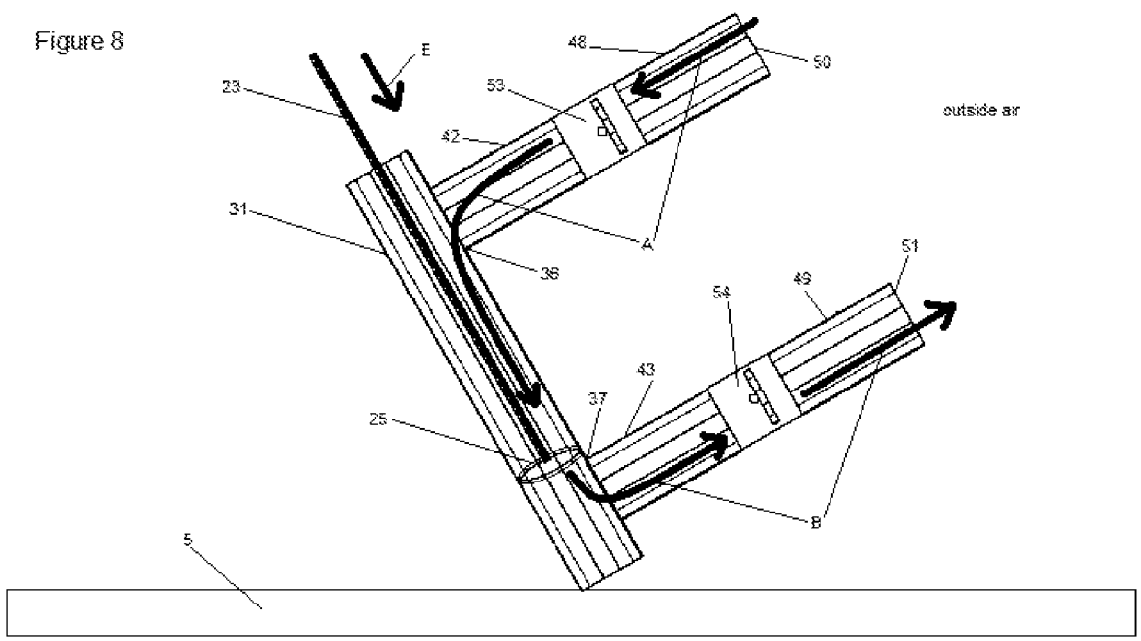

OCEAN WAVE AIR PISTON

BACKGROUND OF THE INVENTION

It has long been recognized that the ocean has great potential for developing energy using environmentally friendly methods. Since the 1800's the art has examples of ocean waves being used to harness power. Generally, attempts to harness power from the ocean can be divided into two categories. Attempts have been made to use the forward motion of either waves or underwater currents to push paddles or the like that drive turbines. U.S. Pat. Nos. 675,039 and 1,887,316 are among the earliest types of these. The second main category is to use the up and down motion of the ocean waves or swells. These methods, while using ocean power initially to drive the system, are most favorable designed when they are less damaging to marine life. This is where the most recent work is being done.

There have been many attempts to use the up and down motion of ocean water to harness power and these can generally be divided into three main categories. The Tapered Channel or Oscillating Water Columns (OSC) methods generally use waves to push air through chambers to drive turbines, U.S. Pat. Nos. 4,441,316 and 6,360,534 are examples of these. Some of these recent methods use the forces generated by the sea very efficiently. In U.S. Pat. No. 5,191,225 the air movement created in both the forward motion of the wave and receding motion of the wave is harnessed using a Wells turbine (U.S. Pat. No. 4,221,538). Overtopping methods use water that drop from a higher elevation to drive turbines, the Wave Dragon (www.wavedragon.net) is an example of this type of method. Power buoys use elevation changes inside a buoy to generate power, U.S. Pat. Nos. 4,434,375 and 6,765,307 are examples of these.

While most of these are in experimental stages at this point, one can see problems with many of these methods. Tapered Channel or Oscillating Water Columns usually are deployed at the shoreline, prime real estate in many parts of the world. Overtopping systems can be deployed at sea but most of their working components come in direct contact with corrosive ocean water. While some of the buoy systems house their working components inside a closed buoy, the advantage these systems gain is in direct relation to the relatively small distance traveled during the up and down movement of the buoy on the wave.

Since wave heights and ocean swells very widely throughout the world but most generally average two to four meters (a relatively small amount) some attempts have been made to increase this relatively small movement by using some sort of mechanical advantage, U.S. Pat. Nos. 6,574,957 and 6,626,636 are examples of these. While wave heights can be mostly counted on to be fairly consistent at one location, at certain times, intervals of smaller waves can be encountered and any mechanical advantage should be able to be changed to reflect these conditions. During storms and such, methods to disconnect from these extreme circumstances have to also be explored.

While some of these prior devices have some parts of their systems that work somewhat well to harness the oceans energy to produce power, all these prior devices have reasons to be commercially unacceptable. It would therefore be a significant advance of the art to provide a device that uses the environmental friendly method of using ocean waves to harness electric power while at the same time being benign to marine life. It would also be a significant advance of the art to be able to deploy this method off shore on either sea bed attached or floating platforms and use non-corrosive air to drive turbines in both directions using Wells type turbines. It would be a further advance in the art if the relatively small forces contained in the up and down movements of waves could be multiplied using some sort of mechanical advance to produce more power per unit (cycle) while at the same time providing for an adjustment at times of calm seas as well as a disconnect from the powerful forces of the ocean when conditions warrant.

BRIEF SUMMARY OF THE INVENTION

This present invention relates generally to the conversion of ocean wave action to electricity, and more particularly to a device that uses the power of ocean waves to produce large volumes of air and funnel that air to drive turbines that generate electrical power.

In particular one object of the invention is to provide an environmental friendly and benign to sea life device for producing electrical power from ocean waves.

Another object is to ensure this device can be used off shore on floating platforms or attached to the sea bed where many such devices could be grouped together.

Another object is to provide for a device that minimizes direct contact with the ocean water but rather uses a float (which is the only direct contact with the water) to drive a piston that moves air in large volumes to run turbines and in which said device is made up from a relatively few moving parts and most of these parts are not in contact with the corrosive nature of sea water.

Another object is being able to produce power from generators driven by turbines that are themselves being driven by forced air that moves thru the turbines in both directions.

Still another object is to harness the relatively small wave movements in such a way that these movements could be multiplied using a mechanical advantage to produce large amounts of air movement.

Another object is to be able to modified the mechanical advantage when small waves are present.

Another object is to be able to disconnect the device when rough seas or extremely large waves are present.

BRIEF DESCRIPTION OF THE DRAWINGS

FIG. 7 is a front view of the device showing the air movement as the piston moves up through the cylinder.

FIG. 8 is a front view of the device showing the air movement as the piston moves down though the cylinder.

DETAILED DESCRIPTION OF THE EMBODIMENTS

Figure 1:
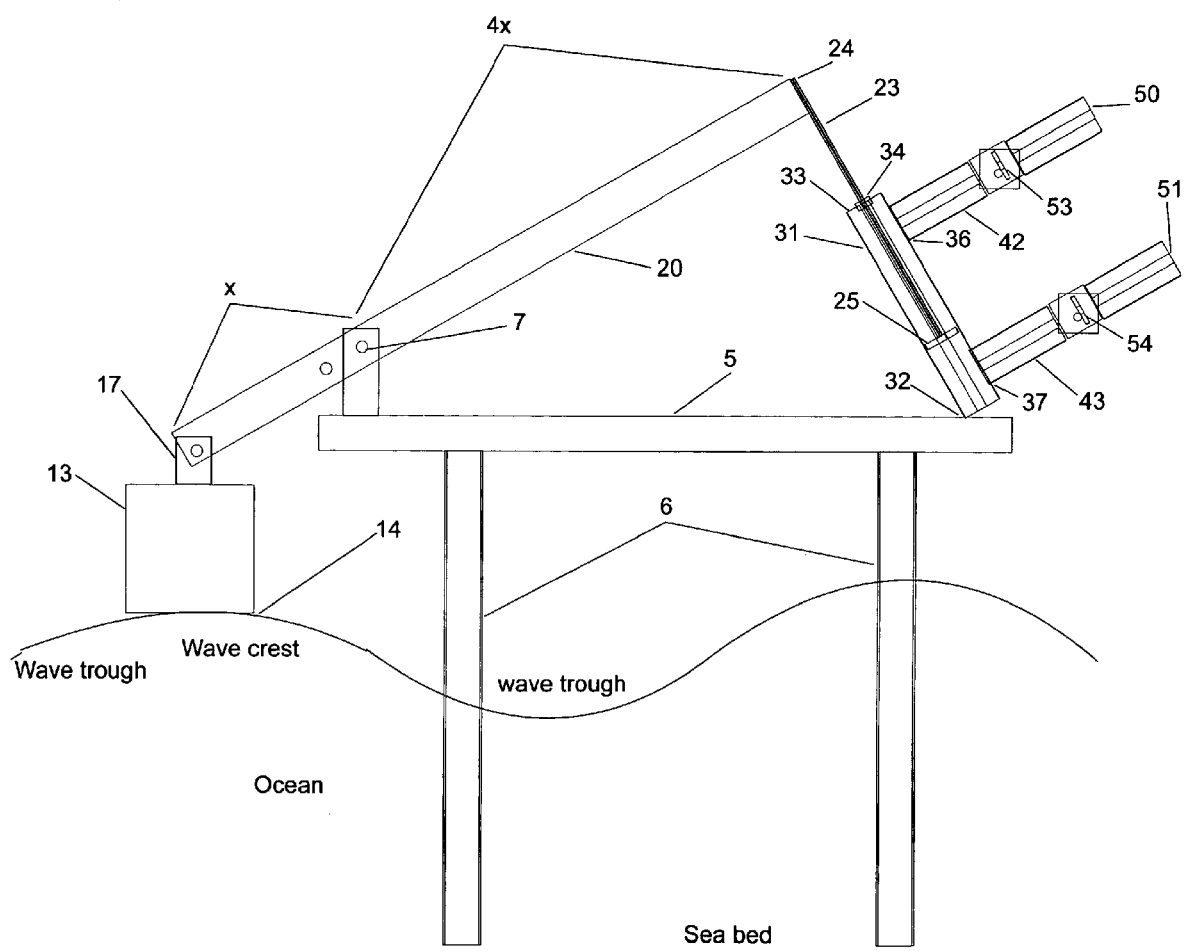
FIG. 1 is a front view of the device showing the piston in the down position and showing the device attached to the sea bed using legs.
Figure 4:
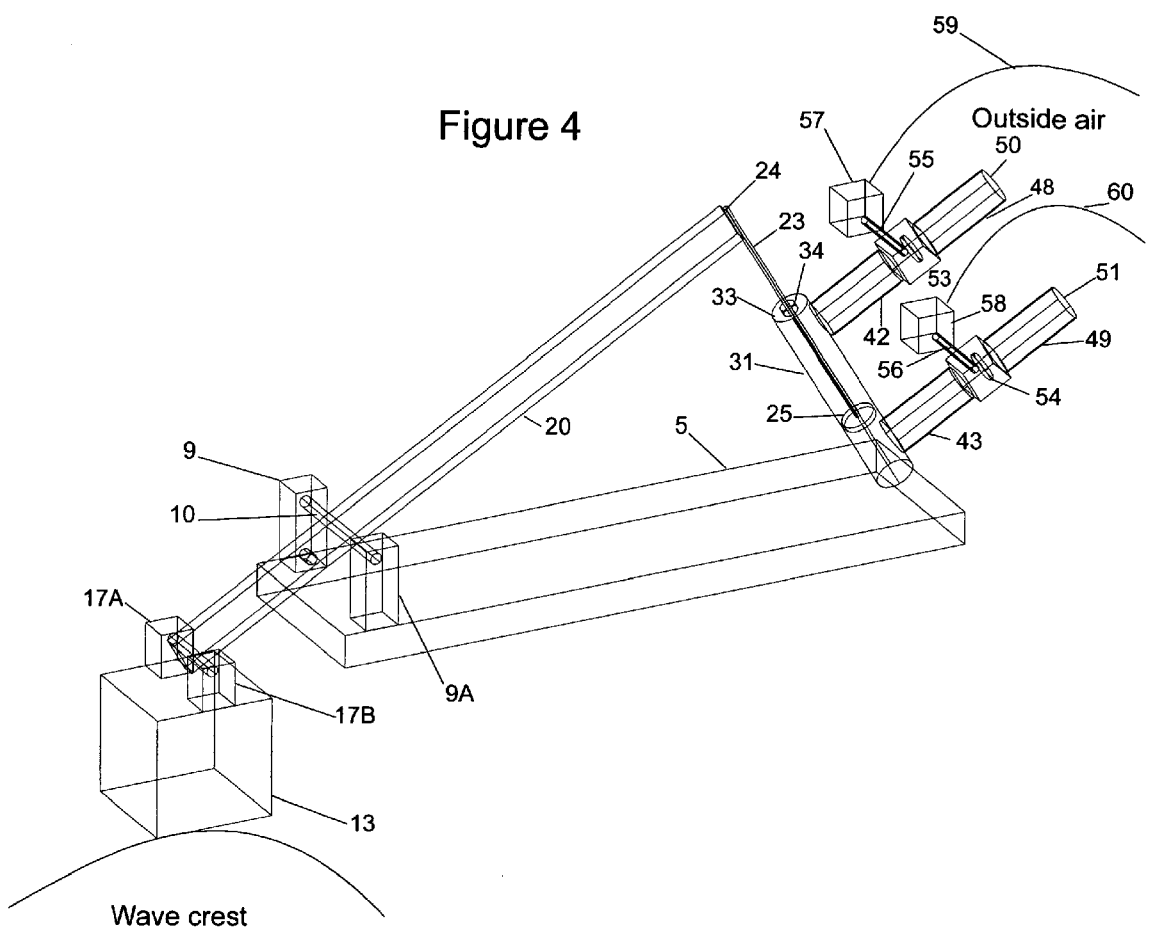
FIG. 4 is a perspective view of the device with the piston shown in the down position.

In FIG. 1 platform 5 is shown in ocean attached to sea bed with legs 6. FIG. 1 also shows the main working parts of the device. A lever arm 20 is attached to the platform 5 at pivot point 7. A float 13 is attached to one end of the lever arm 20 at pivot point 17 and a piston rod 23 is attached to the other end at attachment point 24. On one end of the piston rod 23 is the a piston head 25. The piston rod 23 goes into cylinder 31 thru air tight membrane 34 in cylinder top 33. This cylinder 31 is attached to the platform at a connection point 32, which is a certain fixed distance from pivot point 7. The cylinder 31 is attached to the platform at an angle relative to the movement of the piston. Top air duct 42 is attached to cylinder 31 at top cylinder outlet 36. Bottom air duct 43 is attached to cylinder 31 at bottom cylinder outlet 37. FIG. 4 shows better the air duct connections. Top air duct 42 is connected to top turbine 53 and to top air release duct 48 which connects to top air vent 50. Bottom air duct 43 is connected to bottom turbine 54 and to bottom air release duct 49 which connects to bottom air vent 51. Top generator 57 is connected to top turbine 53 by shaft 55 and power cable 59 is attached to the top generator. Bottom generator 58 is connected to bottom turbine 54 by shaft 56 and power cable 60 is attached to the bottom generator.

Figure 2:
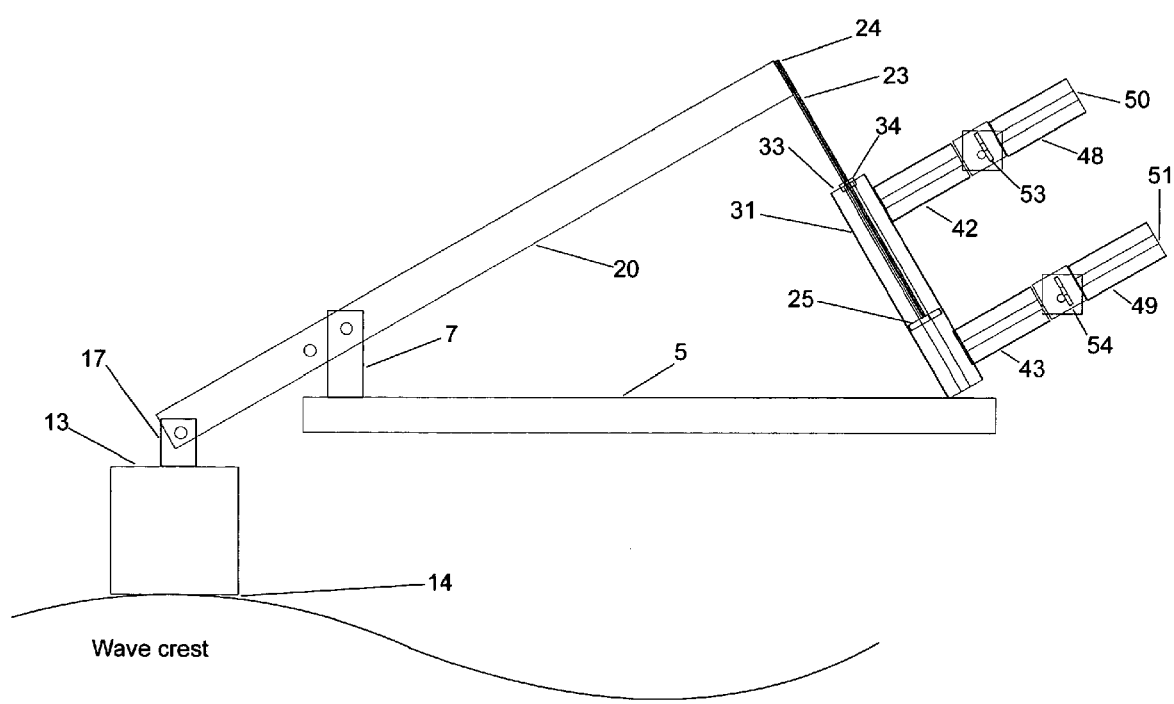
FIG. 2 is a front view of the device showing the piston in the down position but shown as a floating barge.
Figure 3:
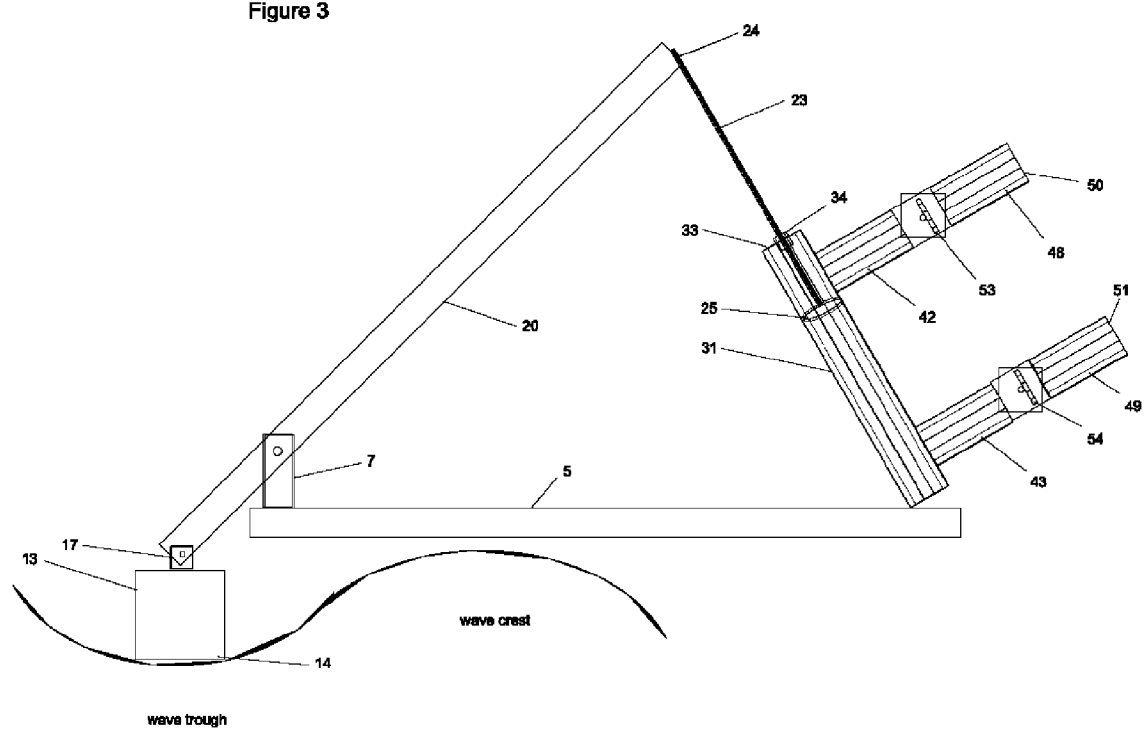
FIG. 3 is a front view of the device showing the piston in the up position.
Figure 6:
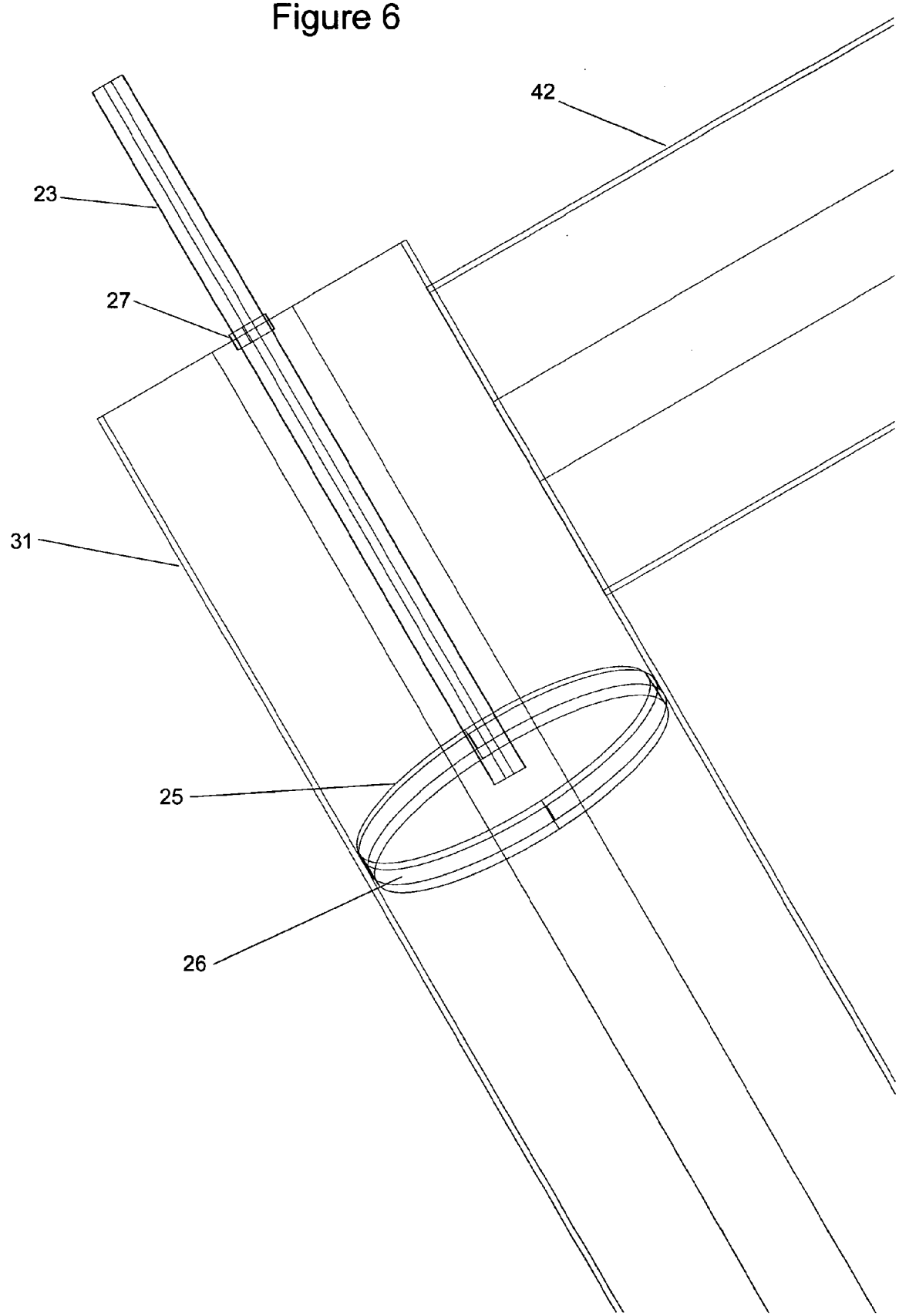
FIG. 6 is a close up view of the piston head and cylinder wall shown in the perspective.

FIG. 2. shows the working mode of the device. In this depiction the platform 5 is a floating barge that is heavy enough that it only moves minimally with the up and down motion of the ocean's waves. The lever arm 20 acts as a see saw. The float 13 is in direct communication with the water at the bottom of the float 14. As waves move into the float area the wave crest pushes the float up which causes the lever arm 20 to pivot at pivot point 7 and the top of the lever arm 24 goes down pushing the piston 23 and the piston head 25 down thru the cylinder 31. FIG. 3 shows the device as the wave trough moves into the float area. The float drops vertically causing the lever arm 20 to pivot at pivot point 7 and the top of the lever arm 24 goes up pulling the piston 23 and the piston head 25 up thru the cylinder 31. As piston 23 and piston head 25 move up and down in the cylinder 31, it is in direct contact with the cylinder walls. FIG. 6 shows a neoprene O-ring 26 that is attached to piston head 25. This allows for an air tight seal between piston head 25 and the walls of the cylinder which further allows for all the air in the cylinder to be pushed out of the cylinder thru either the top or bottom outlet holes.

FIG. 8 shows the piston 23 and the piston head 25 moving down thru the cylinder 31, shown by arrow E. The direction of the air that is pushed in front of the piston head is indicated by arrow B. The air is forced out bottom cylinder outlet 37 thru bottom duct 43 thru bottom turbine 54 thru bottom air release duct 49 and bottom vent 51 to outside air. This action causes bottom turbine 54 to spin. As the falling piston head 25 pushes the air down thru the cylinder a vacuum in created behind the piston head. Arrow A shows the direction of air being sucked into the vacuum that is created. From the outside, air goes thru top vent 50 and top air release duct 48 thru top turbine 53 on thru top duct 43 and into cylinder 31 via top cylinder outlet 36. This action causes top turbine 53 to spin.

FIG. 7 shows the piston 23 and piston head 25 being pulled up thru the cylinder 31, shown by arrow F. As the piston head 25 rises the air is pushed up and as indicated by arrow C the air is forced out top cylinder outlet 36 thru top duct 42 thru top turbine 53 thru top air release duct 48 and top vent 50 to outside air. This action causes top turbine 53 to spin. As the rising piston head 25 pushes the air up thru the cylinder 31 a vacuum is created behind the piston head. Arrow D shows the direction that this air travels as it is sucked into the vacuum that is created by this rising piston head. From the outside, air travels thru bottom vent 51 and bottom air release duct 49 thru bottom turbine 54 on thru bottom duct 43 and into cylinder 31 via bottom cylinder outlet 37. This action causes bottom turbine 54 to spin. In the described embodiment air travels thru both the top and bottom turbines in both directions as it is either being pushed out or sucked in. The use of the Wells turbine allows for the turbine to spin in only one direction irrespective of which direction the air flows.

FIG. 4 shows the top turbine 53 in direct connection to top generator 57 thru connection 55. As top turbine spins, it spins top generator and produces electricity. This electricity is then sent through cable 59 under water to the power grid. Bottom turbine 54 is in direct connection to bottom generator 58 thru connection 56. As bottom turbine spins, it spins bottom generator and produces electricity. Electrical power from bottom generator runs thru bottom cable 60 and on to the power grid.

Figure 5:
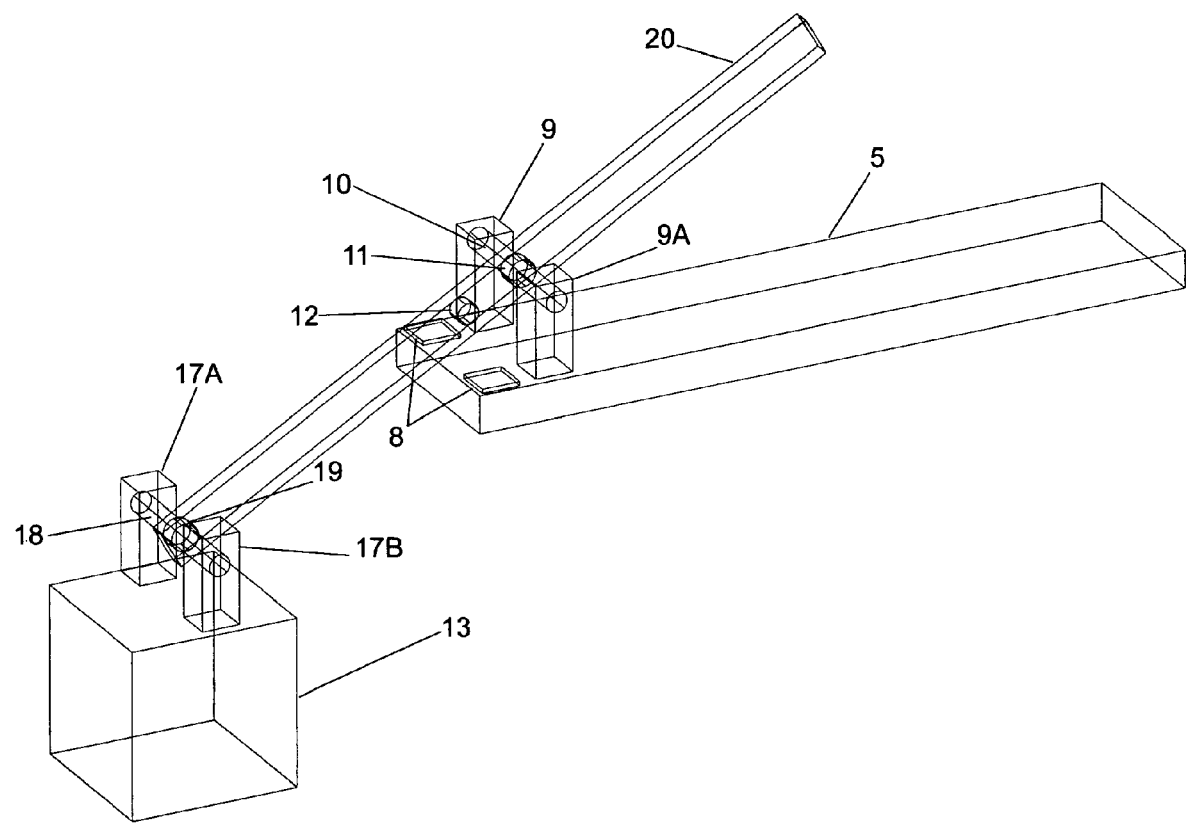
FIG. 5 is a close up view of the float and pivot connection shown in perspective.

As the up and down motion of the ocean waves is continuous, so to is the see saw action of the lever arm and the up and down motion of the piston pushing and sucking air thru the Wells turbines producing constant electrical power. The float 13 must maintain contact with the ocean waves to assure this. FIG. 5 shows hinged float connection to lever arm. Bearings 17A and 17B are attached to the top of the float 13. Bearing shaft 18 goes from bearing 17A thru lever arm 20 at bushing hole 19 to bearing 17B. This assures the float 13 is always in direct contact with the water. It also provides for a place where a disconnection of the device can be accomplished. By removing shaft 18 the float 13 can be removed during storms or extremely rough seas. Without the float to drive the lever arm the device will stop.

As with rough seas, adjustments to the device can also be implemented at times of calm seas. FIG. 5 shows the pivot point connection to lever arm 20. The pivot is a connection much like the connection of the float 13 to lever arm 20. Bearings 9 and 9A are attached to the platform 5. Pivot bearing shaft 10 goes from bearing 9 thru lever arm 20 at bushing hole 11 to bearing 9A. At times of the calm seas the whole pivot bearing assembly can be moved and pivot bearing shaft 10 can be moved to bushing hole 12 in lever arm 20. At the same time bearings 9 and 9A are moved to and attached to platform 5 at a connection point 8. This will allow the piston to still travel the same distance thru the cylinder even through the float is now moving a shorter vertical distance.

As more air flows thru a turbine larger turbines can be used making larger amounts of power. The amount of air flowing thru the turbines of this device is in direct correlation to the diameter of the cylinder as well as the height of the cylinder, more specifically the distance the piston head travels thru the cylinder. As more air is displaced in front of the piston head and behind the piston head as it moves thru the cylinder, more air is directed thru the turbines. In order to achieve the maximum amount of air movement thru the turbines a mechanical advantage is employed. This device is designed to operate at various wave heights, with optimal heights being seas of 4'-8'. FIG. 1 shows length of lever arm 20 between pivot point 7 and float 13 being a distance x. The distance between pivot point 7 and piston connection to lever arm 24 is distance 4x. This allows the piston to move thru the cylinder 16'-32' in seas of 4'-8'. While this is the shown embodiment, even greater mechanical advantages could be used. When greater mechanical advantages are used both the weight of the float and the size of float have to be adjusted. Both the weight and size of the float and its relationship to its distance from the pivot point are governed by well understood principles of physics.

While the above is the preferred embodiment of the invention, many modifications may become apparent to those skilled in the art and these should be considered within the scope spirit of the invention as defined by the following claims.

I claim:

1. An ocean wave activated device that drives air turbines that generate electrical power comprising:
   A. a lever arm that is attached to pivot point at a point between the ends of said arm, said pivot point being secured, at a fixed position relative to the ocean waves, on a platform;
   B. a float that is attached to the end of said lever arm, said float is in direct communication with the ocean waves;
   C. a piston rod that is attached to the opposite end of said lever arm;
   D. a cylinder that is mounted on said platform in a fixed position relative to the pivot point and positioned as to be parallel to the movement of said piston inside said cylinder;
   E. said piston rod is attached to lever arm at one end, the other end being attached to a piston head which is in direct communication with cylinder walls;
   F. said cylinder has an upside outlet and a downside outlet;
   G. a duct that extends from the upside cylinder outlet to an open vent;
   H. a duct that extends from the downside cylinder outlet to an open vent;
   I. bidirectional air turbines affixed within said ducts and arranged in such a way as to be between the cylinder outlets and the vents;
   J. power generators that are in direct communication with said turbines.

2. A device according to claim 1, wherein the pivot point is attached to the lever arm at a point whereas the distance from the pivot point to the piston rod end of the lever arm is some multiple greater than the distance from the pivot point to the float end of the lever arm.

3. A device according to claim 1, wherein the pivot point is attached to the lever arm by such means whereas the pivot point could be moved and attached at different locations along said arm.

4. A device according to claim 1, wherein said float is attached to end of lever arm by means of a detachable mechanism.

5. A device according to claim 1, wherein the weight of the float is in direct correlation to the weight of the piston and the position the pivot point is attached on the lever arm.

6. A device according to claim 1, wherein the size of the float is in direct correlation to its weight.

7. A device according to claim 1, wherein the piston head located inside the cylinder has a neoprene membrane between it and the cylinder walls.

8. A device according to claim 1, wherein said turbines are Wells type turbines.

9. A device according to claim 1, wherein said platform can be attached to the ocean bed or mounted on a larger floating platform.

* * * * *